US011140614B2

(12) United States Patent
Ovesjö et al.

(10) Patent No.: US 11,140,614 B2
(45) Date of Patent: Oct. 5, 2021

(54) COMBINED LAYER 3 AND DOWNLINK CONTROL INFORMATION (DCI) SIGNALING OF VIRTUAL CELL ID

(71) Applicant: Telefonaktiebolaget LM Ericsson (publ), Stockholm (SE)

(72) Inventors: Fredrik Ovesjö, Älvsjö (SE); Robert Baldemair, Solna (SE); Lars Lindbom, Karlstad (SE); Oskar Mauritz, Johanneshov (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 130 days.

(21) Appl. No.: 16/491,720

(22) PCT Filed: Mar. 15, 2017

(86) PCT No.: PCT/EP2017/056136
§ 371 (c)(1),
(2) Date: Sep. 6, 2019

(87) PCT Pub. No.: WO2018/166594
PCT Pub. Date: Sep. 20, 2018

(65) Prior Publication Data
US 2021/0136662 A1   May 6, 2021

(51) Int. Cl.
*H04W 48/12*   (2009.01)
*H04W 72/04*   (2009.01)

(52) U.S. Cl.
CPC ......... *H04W 48/12* (2013.01); *H04W 72/042* (2013.01)

(58) Field of Classification Search
None
See application file for complete search history.

(56) References Cited

U.S. PATENT DOCUMENTS 9,450,719 B2    9/2016  Park et al.
2013/0235821 A1 9/2013  Chen et al.
(Continued)

OTHER PUBLICATIONS

Indian Office Action dated Dec. 16, 2020 for Application No. 201947036294, consisting of 6-pages.
(Continued)

*Primary Examiner* — Duc T Duong
(74) *Attorney, Agent, or Firm* — Christopher & Weisberg, P.A.

(57) ABSTRACT

Methods, network nodes and wireless devices for determining a virtual cell index field length. According to one aspect, a method of determining a length of a virtual cell index field to be transmitted with downlink control information, DCI, is performed where the virtual cell index field length for transmitting a virtual cell index to a wireless device is dynamically settable. The method includes determining a number of configured virtual cell identities, ID. The method includes transmitting the configured virtual cell identities to the wireless device. When a number of configured virtual cell IDs is greater than one, the method includes selecting a virtual cell index corresponding to a particular one of the virtual cell IDs and setting the virtual cell index field length based on the number of virtual cell IDs. The method includes transmitting the selected virtual cell index in the virtual cell index field to the wireless device.

22 Claims, 10 Drawing Sheets

(56) References Cited

U.S. PATENT DOCUMENTS

| | | | |
|---|---|---|---|
| 2013/0275106 A1* | 10/2013 | Li | G01V 11/00 |
| | | | 703/10 |
| 2013/0301467 A1* | 11/2013 | Kang | H04B 7/024 |
| | | | 370/252 |
| 2014/0056243 A1* | 2/2014 | Pelletier | H04W 52/365 |
| | | | 370/329 |
| 2014/0219202 A1* | 8/2014 | Kim | H04W 72/0413 |
| | | | 370/329 |
| 2014/0302863 A1* | 10/2014 | Chen | H04W 16/10 |
| | | | 455/452.1 |
| 2014/0314031 A1* | 10/2014 | Kim | H04L 5/001 |
| | | | 370/329 |
| 2015/0036607 A1* | 2/2015 | Park | H04L 5/0035 |
| | | | 370/329 |
| 2016/0013903 A1 | 1/2016 | Kim et al. | |
| 2016/0080963 A1* | 3/2016 | Marinier | H04W 24/08 |
| | | | 370/252 |
| 2017/0041932 A1* | 2/2017 | Chae | H04W 72/0446 |
| 2017/0222763 A1* | 8/2017 | Lee | H04L 1/1812 |

OTHER PUBLICATIONS

International Search Report and Written Opinion dated Nov. 15, 2017 for International Application No. PCT/EP2017/056136 filed on Mar. 15, 2017, consisting of 11-pages.

* cited by examiner

COMBINED LAYER 3 AND DOWNLINK CONTROL INFORMATION (DCI) SIGNALING OF VIRTUAL CELL ID

CROSS-REFERENCE TO RELATED APPLICATION

This application is a Submission Under 35 U.S.C. § 371 for U.S. National Stage Patent Application of International Application Number: PCT/EP2017/056136, filed Mar. 15, 2017 entitled "COMBINED LAYER 3 AND DOWNLINK CONTROL INFORMATION (DCI) SIGNALING OF VIRTUAL CELL ID," the entirety of which is incorporated herein by reference.

TECHNICAL FIELD

This disclosure relates to wireless communication, and in particular to efficient combined Layer 3 (L3) and downlink control information (DCI) signaling of virtual cell identity.

BACKGROUND

In a long term evolution (LTE) wireless communication network, the physical downlink control channel (PDCCH) is used to send DCI messages to wireless devices, for example, to schedule physical downlink shared channel (PDSCH) transmissions or to grant permission for physical uplink shared channel (PUSCH) transmissions. Pseudo-random reference symbol sequences used for the demodulation reference signal (DMRS) associated with the PDSCH and PUSCH transmissions depend on several variables used to initialize the pseudo-random sequence generation function. In many cases, the reference symbol sequence will depend on the physical cell identity of the physical cell serving the wireless device. The physical cell identity is conveyed by the primary synchronization signals (PSS) and secondary synchronization signals (SSS). However, there are also cases—for example, with coordinated multipoint (CoMP) transmission—where it is useful to not tie the reference symbol sequence generation directly to the physical cell identity. For these cases, the concept of a virtual cell identity has been introduced in LTE systems.

For example, in LTE systems, a wireless device-specific reference signal associated with the PDSCH is generated as:

$$r_{n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{PDSCH} - 1$$

where the pseudo-random sequence generator generating the sequence c(i) shall be initialized with $$c_{init} = (\lfloor n_s/2 \rfloor + 1) \cdot (2n_{ID}^{(nSCID)} + 1) \cdot 2^{16} + n_{SCID}$$

at the start of each subframe. The quantities $n_{ID}^{(i)}$, i=0,1, are cell identities and are given by $n_{ID}^{(i)} = N_{ID}^{cell}$ if no value for $n_{ID}^{DMRS, i}$ is provided by higher layers and $n_{ID}^{(i)} = n_{ID}^{DMRS, i}$ otherwise The value of the virtual cell index, $n_{SCID}$, is signalled using the DCI.

This means that if no virtual cell identity (ID) is configured by a higher layer of the network node generating the DMRS, the physical layer cell identity is used as the value of the cell identity. Otherwise, a virtual cell identity is used as the cell identity and the virtual cell index corresponding to the virtual cell identity is sent in the DCI and is used in random sequence generation.

The virtual cell identity is communicated to a wireless device by sending an index corresponding to the virtual cell whose identity is used to generate the pseudo-random sequence. The virtual cell index is sent in the DCI together with other information. As an example, Table 1 shows values of one or two codewords used to convey this information.

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

As an alternative to Table 1, in which 3 bits are specified, Table 2 shows values of one or two codewords used to convey the information when 4 bits are specified.

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 2) | 0 | 2 layer, port 7-8, $n_{SCID}$ = 0 (OCC = 2) |
| 1 | 1 layer, port 7, $n_{SCID}$ = 1 (OCC = 2) | 1 | 2 layer, port 7-8, $n_{SCID}$ = 1 (OCC = 2) |
| 2 | 1 layer, port 8, $n_{SCID}$ = 0 (OCC = 2) | 2 | 2 layer, port 7-8, $n_{SCID}$ = 0 (OCC = 4) |
| 3 | 1 layer, port 8, $n_{SCID}$ = 1 (OCC = 2) | 3 | 2 layer, port 7-8, $n_{SCID}$ = 1 (OCC = 4) |
| 4 | 1 layer, port 7, $n_{SCID}$ = 0 (OCC = 4) | 4 | 2 layer, port 11, 13, $n_{SCID}$ = 0 (OCC = 4) |
| 5 | 1 layer, port 7, $n_{SCID}$ = 1 (OCC = 4) | 5 | 2 layer, port 11, 13, $n_{SCID}$ = 1 (OCC = 4) |
| 6 | 1 layer, port 8, $n_{SCID}$ = 0 (OCC = 4) | 6 | 3 layer, port 7-9 |
| 7 | 1 layer, port 8, $n_{SCID}$ index = 1 (OCC = 4) | 7 | 4 layer, port 7-10 |
| 8 | 1 layer, port 11, $n_{SCID}$ index = 0 (OCC = 4) | 8 | 5 layer, port 7-11 |
| 9 | 1 layer, port 11, $n_{SCID}$ index = 1 (OCC = 4) | 9 | 6 layer, port 7-12 |
| 10 | 1 layer, port 13, $n_{SCID}$ index = 0 (OCC = 4) | 10 | 7 layers, ports 7-13 |
| 11 | 1 layer, port 13, $n_{SCID}$ index = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Notice that the configurations represented by Tables 1 and 2 define only two virtual cell configurations. When more than two virtual cells may be configured, a higher number of bits would be required to represent the information of layers, ports and virtual cell indices. Hence, the size of DCI will vary depending on the number of virtual cells configured by the network node. This results in potentially high signaling overhead and high control channel overhead.

SUMMARY

Some embodiments advantageously provide methods, network nodes and wireless devices for determining a virtual cell index field length. According to one aspect, a method of determining a length of a virtual cell index field to be transmitted with downlink control information, DCI, where the virtual cell index field length for transmitting a virtual cell index to a wireless device is dynamically settable. The method includes determining a number of configured virtual cell identities, ID. When a number of configured virtual cell IDs is greater than one, the method includes selecting a virtual cell index corresponding to a particular one of the virtual cell IDs and setting the virtual cell index field length based on the number of virtual cell IDs. The method includes transmitting the selected virtual cell index in the virtual cell index field to the wireless device.

According to this aspect, in some embodiments, the method includes transmitting the configured virtual cell identities to the wireless device. In some embodiments, when the number of virtual cell IDs is zero, the method includes setting the length of the virtual cell index field to be of length zero and transmitting no virtual cell IDs, thereby causing the wireless device to use a physical layer cell identity to generate a pseudo-random sequence. In some embodiments, when the number of virtual cell IDs is one, the method includes setting the length of the virtual cell index field to be of length zero and transmitting a single virtual cell ID, thereby causing the wireless device to use the one virtual cell identity to generate a pseudo-random sequence. In some embodiments, the pseudo-random sequence is one of a reference sequence and a scrambling sequence. In some embodiments, the length of the virtual cell index field is log2(N) bits where N is the number of configured virtual cell IDs. In some embodiments, an identity of the wireless device is used to generate a pseudo-random sequence.

According to another aspect, a network node for determining a length of a virtual cell index field in downlink control information, DCI, is provided, where the virtual cell index field length for transmitting a virtual cell index to a wireless device is dynamically settable. The network node includes processing circuitry configured to determine a number of configured virtual cell identities, IDs. The processing circuitry is further configured such that, when a number of configured virtual cell IDs is greater than one, the processing circuitry selects a virtual cell index of a particular one of the virtual cells, and sets the virtual cell index field length based on the number of virtual cell IDs. The network node also includes a transmitter configured to transmit the selected virtual cell index in the virtual cell index field to the wireless device.

According to this aspect, in some embodiments, the transmitter is further configured to transmit the configured virtual cell identities to the wireless device. In some embodiments, when the number of virtual cells configured for the wireless device is zero, the processing circuitry is further configured to set the length of the virtual cell index field to be of length zero, in which case no virtual cell ID is transmitted by the transmitter to the wireless device to cause the wireless device to use a physical layer cell identity to generate a pseudo-random sequence. In some embodiments, when the number of virtual cells configured for the wireless device is one, the processing circuitry is further configured to set the length of the virtual cell index field to be of length zero, in which case one virtual cell ID is transmitted to the wireless device to cause the wireless device to use the one virtual cell identity to generate a pseudo-random sequence. In some embodiments, the length of the virtual cell index field is log2(N) bits where N is the number of configured virtual cell IDs. In some embodiments, an identity of the wireless device is used to generate one of a reference sequence and a scrambling sequence.

According to yet another aspect, a network node for determining a length of a virtual cell index field in downlink control information, DCI, is provided, where the virtual cell index field length for transmitting a virtual cell index to a wireless device is dynamically settable. The network node includes a virtual cell determiner module configured to determine a number of configured virtual cell identities, IDs. The network node further includes a virtual cell selector module configured to select a particular one of the virtual cell IDs when a number of virtual cells configured for the wireless device is greater than one. The network node further includes a virtual cell index field length determiner module configured to set the virtual cell index field length based on the number of virtual cell IDs. The network node further includes a transmitter module configured to transmit the selected virtual cell index in the virtual cell index field to the wireless device.

According to another aspect, a method for use in a wireless device of generating a pseudo-random sequence based on information received from a network node is provided. The method includes determining a length of a virtual cell index field of downlink control information, DCI, based on a number of configured virtual cell IDs. The method also includes receiving the DCI from the network node. When the length of the virtual cell index field is greater than zero, the method includes generating the pseudo-random sequence based on a virtual cell index contained in the virtual cell index field of the received DCI.

According to this aspect, in some embodiments, the method includes receiving a number of configured virtual cell identities, IDs, from the network node. In some embodiments, the method includes determining whether one of a physical layer cell identity and a virtual cell identity is to be used to generate the pseudo-random sequence based on the received number of virtual cell IDs. In some embodiments, the pseudo-random sequence is one of a reference sequence and a scrambling sequence. In some embodiments, an identity of the wireless device is used to generate the pseudo-random sequence.

According to another aspect, a wireless device configured to generate a pseudo-random sequence based on information received from a network node. A receiver is configured to receive DCI from the network node. The wireless device includes processing circuitry configured to determine a length of a virtual cell index field of the DCI based on a number of configured virtual cell IDs, and when the length of the virtual cell index field is greater than zero, generate the pseudo-random sequence based on a virtual cell index contained in the virtual cell index field of the received DCI.

According to this aspect, in some embodiments, the receiver is configured to receive a number of configured virtual cell identities from the network node. In some embodiments, the processing circuitry is further configured to determine whether one of a physical layer cell identity and a virtual cell identity is to be used to generate the pseudo-random sequence, based on the received number of virtual cell IDs. In some embodiments, the pseudo-random sequence is one of a reference sequence and a scrambling sequence. In some embodiments, an identity of the wireless device is used to generate the pseudo-random sequence.

According to another aspect, a wireless device configured to generate a pseudo-random sequence based on information received from a network node is provided. The wireless device includes a receiver module configured to: to receive DCI from the network node. A virtual cell index field length determination module (49) is configured to determine a length of a virtual cell index field of the DCI based on the number of configured virtual cell IDs. The wireless device further includes a sequence generator module configured to, when the length of the virtual cell index field is greater than zero, generate the pseudo-random sequence based on a virtual cell index contained in the virtual cell index field of the received DCI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
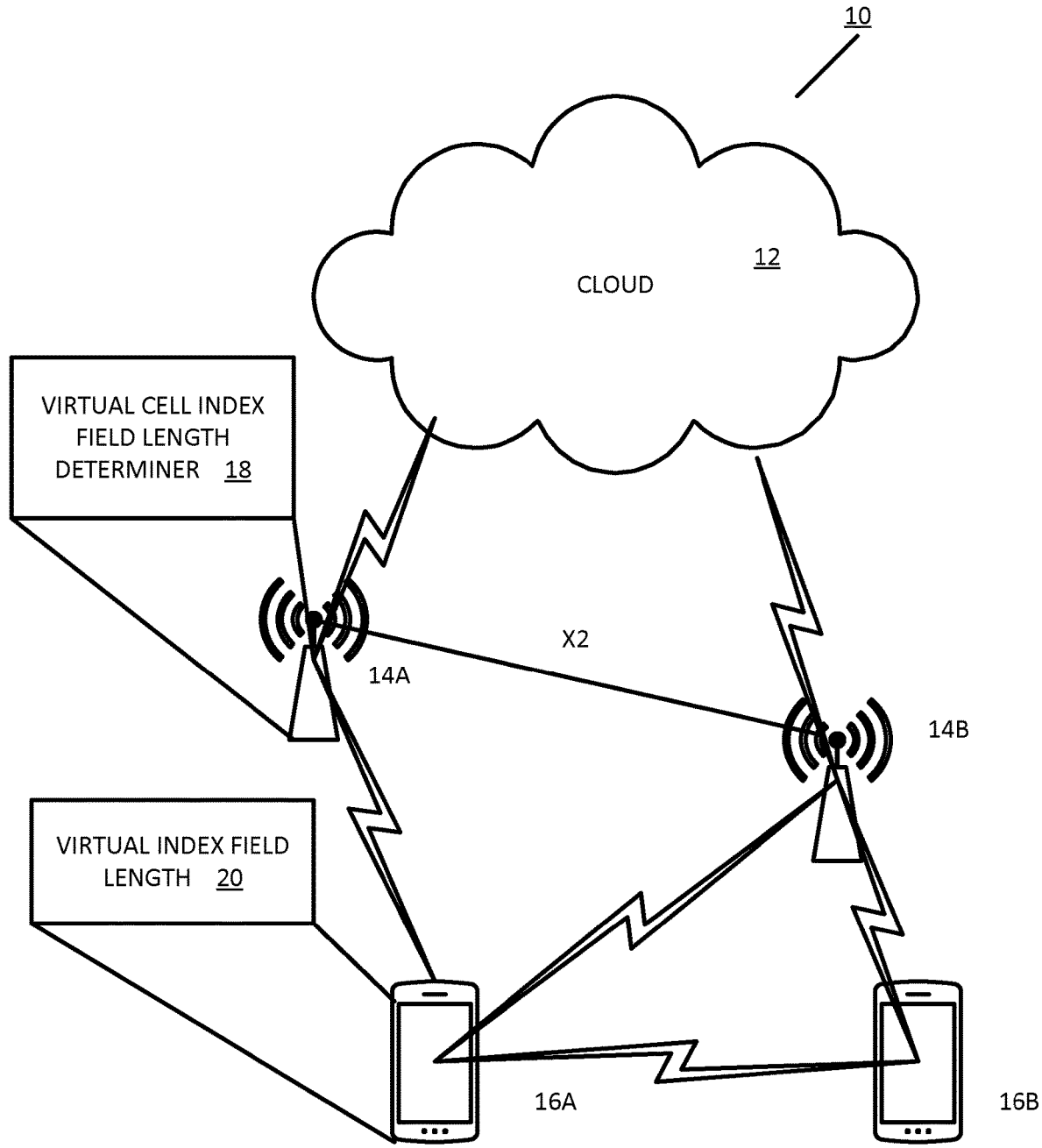
FIG. 1 is a block diagram of a wireless communication system constructed in accordance with principles set forth herein.

Before describing in detail exemplary embodiments, it is noted that the embodiments reside primarily in combinations of apparatus components and processing steps related to efficient combined L3 and downlink control information (DCI) signaling of virtual cell identity. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide a flexible way of defining virtual cell IDs that minimize the size of the bit field in DCI used to signal the index of the virtual cell ID to use in reference sequence generation. Reduced DCI size leads to lower control channel load and increased coverage of the PDCCH control channel.

In some embodiments, a flexible number of virtual field cells can be configured by a network node and each one of them may be associated with a corresponding virtual cell ID. Initially, such as at initial connection establishment or when a handover of a wireless device from one cell to another occurs, a list of virtual cell identities and corresponding indices of configured virtual cells is sent to the wireless device using layer 3 (L3) signaling, such as radio resource control (RRC) signaling. Then, any one of these virtual cell IDs might subsequently be selected as the virtual cell identity for generating a DMRS or other pseudo-random sequence. The index corresponding to the selected virtual cell ID can be transmitted in a field of the DCI. In some embodiments, the index numbers may be implicitly provided by the L3 signaling, i.e., where L3 defines an ordered list, and the first item in the list is associated with index 0.

Rather than coupling the virtual cell index with other information, as described in the background section above, a separate virtual cell index field in the DCI is defined and used to transmit the selected virtual cell index. Further, the length of the virtual cell index field may be caused to be based on the number of virtual cells configured by the network node. For example, if the total number of virtual cells is 2, the length of the virtual cell index field is one bit. If the total number of virtual cells is 4, for example, the length of the virtual cell index field is 2 bits. In this way, the overhead of signaling of the virtual cell index field is small and efficient as compared to known methods.

Moreover, the length of the virtual cell index field can be zero when there is no virtual cell ID configured by the network node. In this case, the pseudo-random sequence generated may be based on the physical layer cell ID. Further, when exactly one virtual cell ID is configured, once again, the length of the virtual cell index field can be zero and the wireless device can be signaled by the network node using higher level signaling to inform the wireless device to use the virtual cell index corresponding to the one configured virtual cell to generate the pseudo-random sequence.

Referring now to the drawing figures, in which like elements are referred to by like reference numerals, there is shown in FIG. 1 a block diagram of a wireless communication system 10. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that that other interface types can be used for communication between network nodes 14 for other communication protocols such as New Radio (NR). The network nodes 20 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 16 so that other nodes can perform one or more functions or even parts of functions described herein.

Returning to FIG. 1, a network node 14 has a virtual cell index field length determiner 18 configured to determine the length of a virtual cell index field of the DCI. The virtual cell index field may be zero if no virtual cell is configured by the network node 14 or if only one virtual cell is configured by the network node 14, in which case, layer 3 (L3) signaling such as radio resource control (RRC) signaling implicitly informs the wireless device 16 whether to base a pseudo-random sequence on the identity of the physical layer cell (when no virtual cell is configured by the network node 14) or on a virtual cell identity (when only one virtual cell is configured by the network node 14). If more than one virtual cell is configured by the network node 14, then the virtual cell index field is greater than zero and the L3 signaling such as the RRC signaling implicitly informs the wireless device 16 of the number of configured virtual cells from which the wireless device 16 can determine size of the virtual cell index field. In this case the virtual cell index field of the DCI contains the index of a virtual cell configured by the network node 14. The virtual cell index field length 20 is stored in the wireless device 16. Note that where RRC signaling is used herein, this is but one example of layer 3 signaling that can be used to signal information to the wireless device 16. Other layer 3 signaling protocols may be employed consistent with this disclosure.

Thus, the virtual cell identities and the corresponding indices are initially signaled to the wireless device 16 at an L3 event, such as handover. When no virtual cells are configured, no virtual cell identities and indices are sent and the wireless device 16 may infer that a physical layer cell identity is to be used to generate the pseudo-random sequence. When only one virtual cell identity and corresponding index is signaled, the wireless device 16 may infer that the one sent virtual cell identity is to be used to generate the pseudo-random sequence. When a plurality of virtual cell identities and corresponding indices are initially sent, the virtual cell index of the virtual cell to be used by the wireless device 16 to generate the pseudo-random sequence is sent to the wireless device 16 in the virtual cell index field of the DCI. The length of the virtual cell index field may be calculated by the both the network node 14 and the wireless device 16 based on the total number of configured virtual cells.

Figure 2:
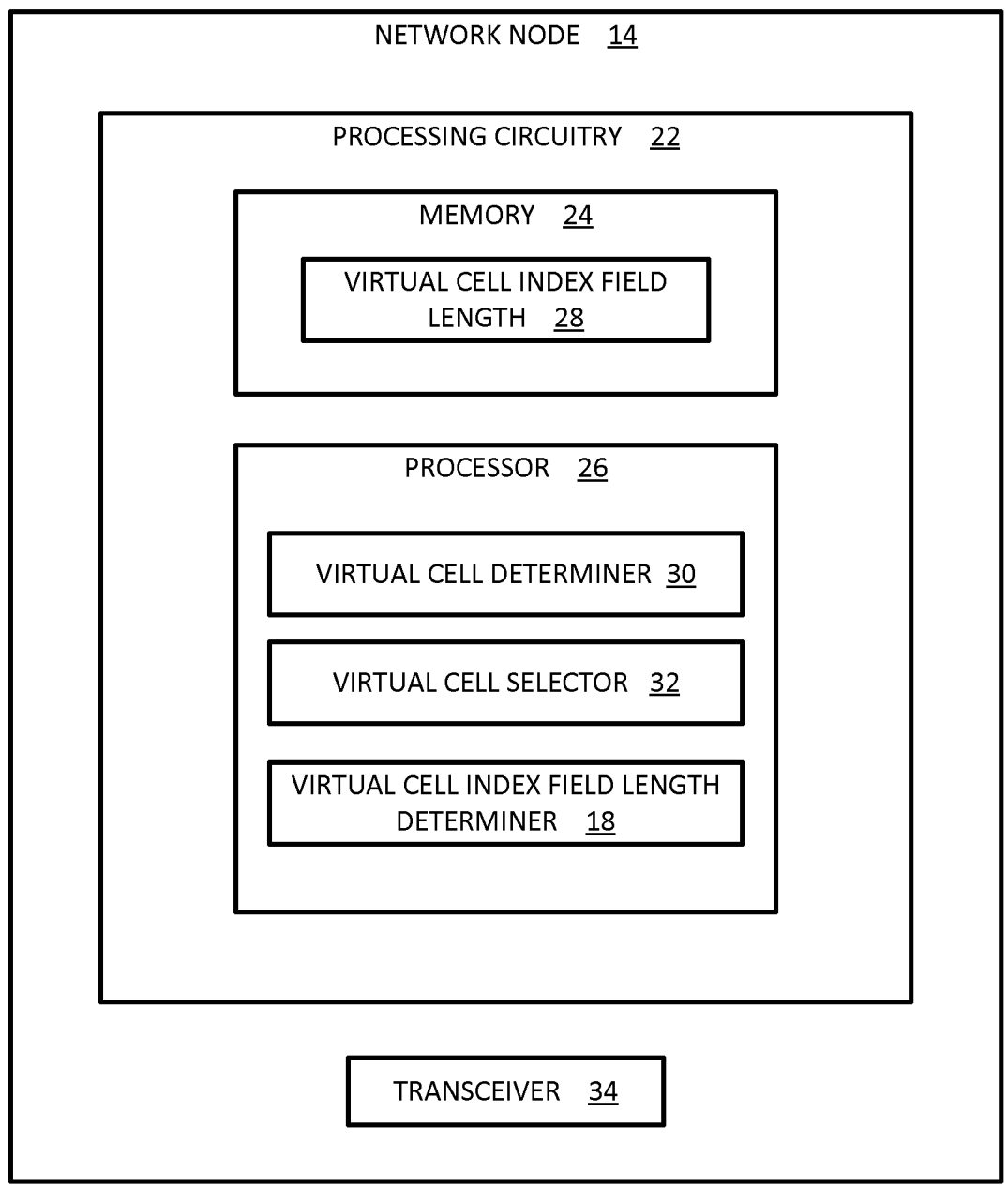
FIG. 2 is a block diagram of a network node configured according to principles set forth herein.

FIG. 2 is a block diagram of a network node 14 configured according to principles set forth herein. The network node 14 includes processing circuitry 22. In some embodiments, the processing circuitry 22 may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store a virtual cell index field length 28, which may be zero, one or more than one. The virtual cell index field length is determined by the virtual cell index field length determiner 18, which may be implemented by the processor 26 operating under the directions of software or may be strictly hardware as discussed above. A virtual cell determiner 30 determines a number of virtual cells configured by the network node 14. A virtual cell selector module 32 selects one of the virtual cells configured by the network node 14.

In some embodiments, the identities and corresponding indices of the configured virtual cells, if any, are signaled to the wireless device 16 by layer 3 signaling. This signaling occurs when a configuration event, such as a handover or configuration of virtual cells, occurs. The virtual cell index field length determiner 30 determines the virtual cell index field length based on the number of virtual cells configured by the network node 14. The network node 14 also includes a transceiver 34. In one embodiment, the transceiver 34 is configured to transmit the list of configured virtual cells to the wireless device 16 via L3 signaling, such as RRC signaling. Subsequently, when more than one virtual cell is configured, the DCI containing the virtual index field is also transmitted to the wireless device 16 via the transceiver 34.

This index is used by the wireless device 16 to determine the virtual cell ID used to generate the pseudo-random sequence.

Figure 3:
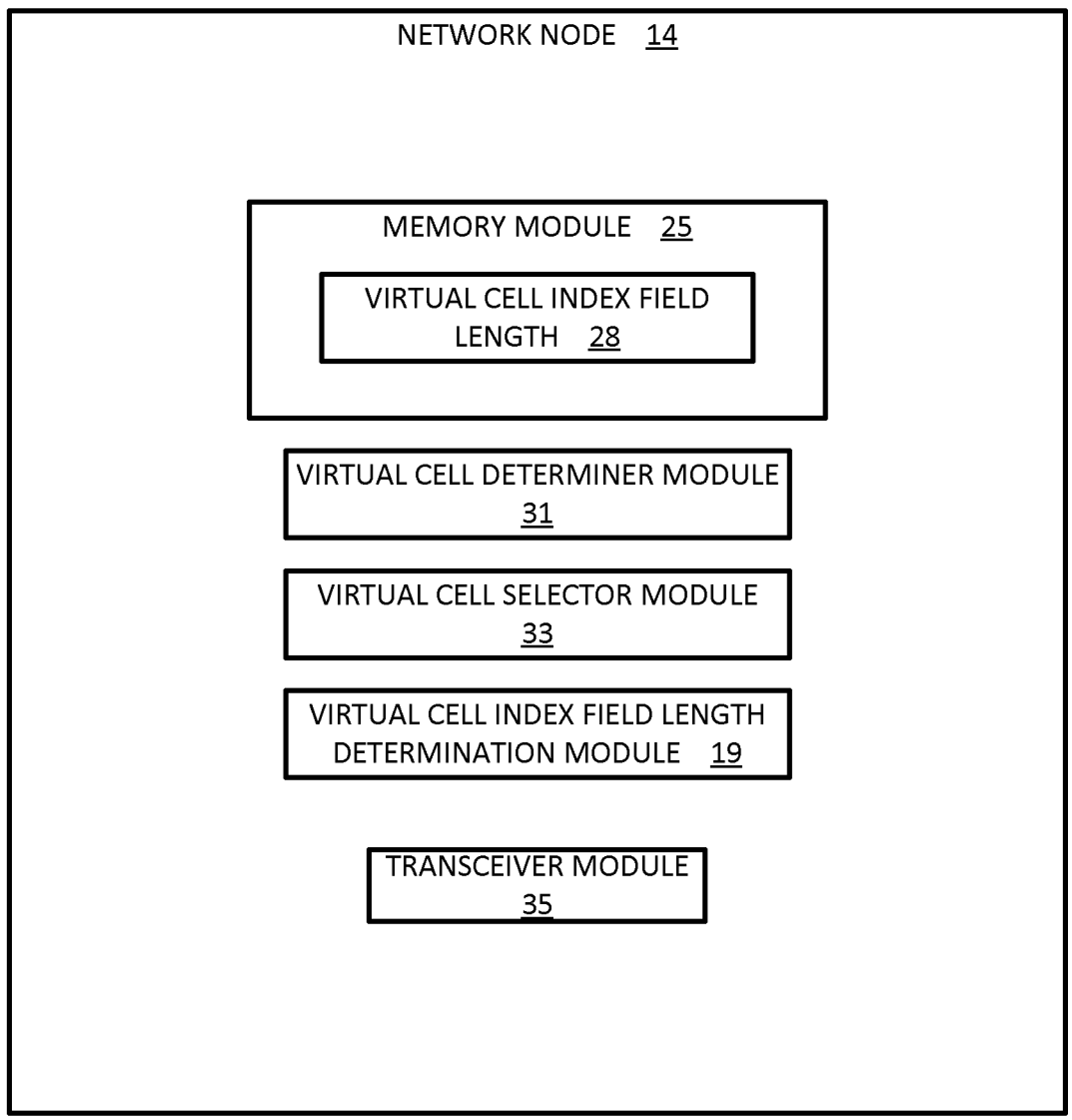
FIG. 3 is a block diagram of an alternative embodiment of the network node which may be implemented in part by software modules executed by a processor.

FIG. 3 is a block diagram of an alternative embodiment of the network node 14 which may be implemented in part by software modules executed by a processor. A memory module 25 is configured to store the virtual cell index field length 28 determined by the virtual cell index field length determination module 19. A virtual cell determiner module 31 determines a number of virtual cells configured by the network node 14. A virtual cell selector module 33 selects one of the virtual cells configured by the network node 14. The virtual cell index field length determiner module 19 determines the virtual cell index field length based on the number of virtual cells configured by the network node 14. The transceiver module 35 transmits the list of zero, one or more configured virtual cells to the wireless device 16. This enables the wireless device 16 to determine the total number of configured virtual cells, from which the wireless device 16 can determine whether to use the physical layer cell identity (when the number of configured virtual cells is zero) or a virtual cell identity (when the number of configured virtual cells is one) to generate the pseudo-random sequence. Further, the wireless device can determine the length of the virtual cell index field based on the total number of configured virtual cells received from the network node 14.

Figure 4:
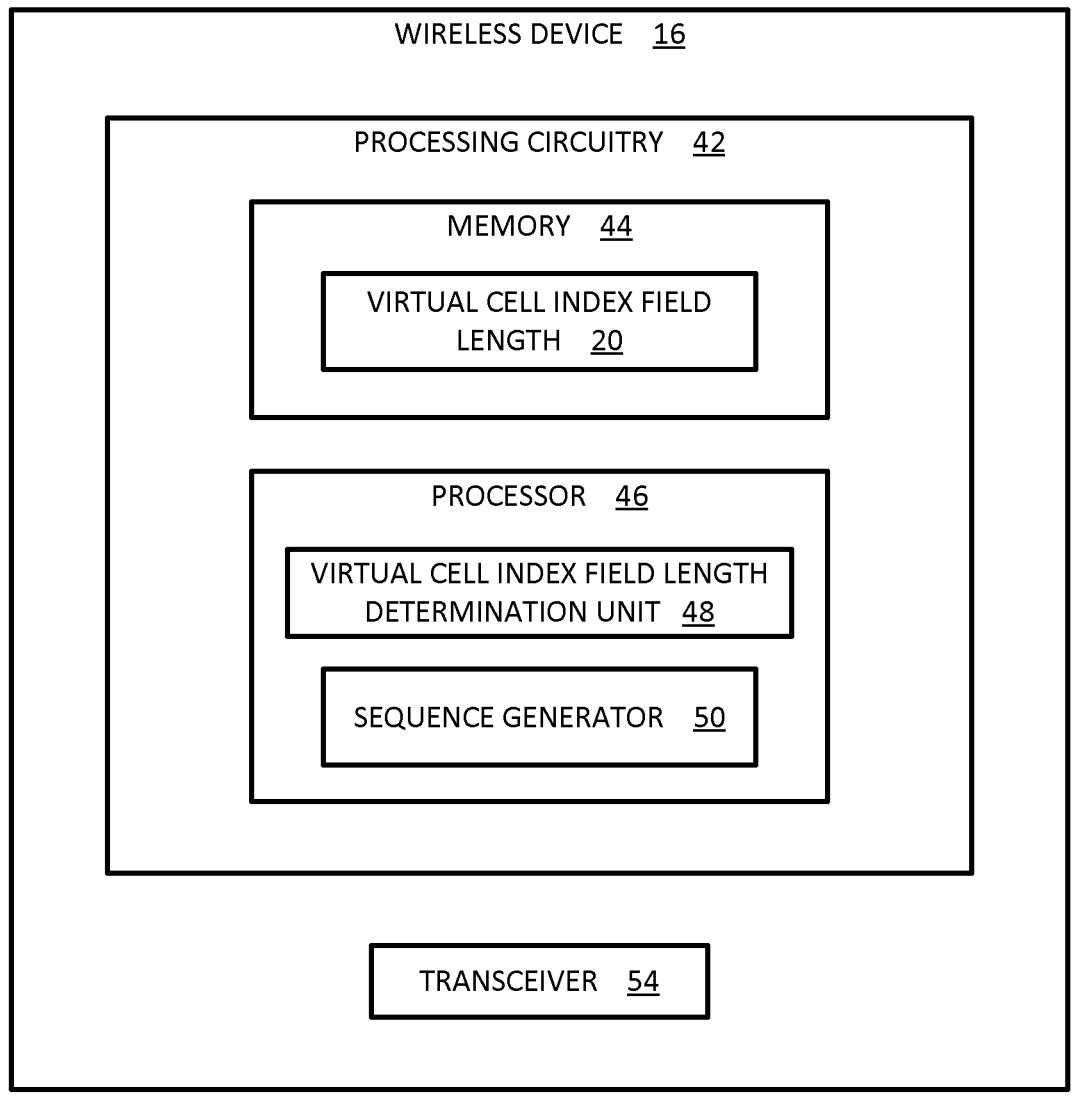
FIG. 4 is a block diagram of a wireless device constructed in accordance with principles set forth herein.

FIG. 4 is a block diagram of a wireless device 16, which includes processing circuitry 42. In some embodiments, the processing circuitry 42 may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 24 is configured to store a virtual cell index field length 20, which may be zero, one or more than one. This should be the same virtual cell index field length 28 determined by the network node 14. The wireless device 16 has a virtual cell index field length determination unit 48 that determines the length of the virtual cell index field based on the total number of configured virtual cells previously signaled to the wireless device 16. The wireless device 16 also includes a sequence generator 50, implemented by the processor 46, that generates a pseudo-random sequence based on either the physical layer cell ID, a single virtual cell ID or a virtual cell ID indicated by the virtual cell index field of the DCI. The received single virtual cell ID is the virtual cell ID used to generate the pseudo-random sequence when only one virtual cell ID was previously signaled to the wireless device 16. The wireless device 16 also has a transceiver 54 that is configured to receive the DCI and RRC signaling. Thus, the transceiver 54 receives the RRC signaling that indicates the list of configured virtual cells, and receives the DCI which contains the virtual length index field.

Figure 5:
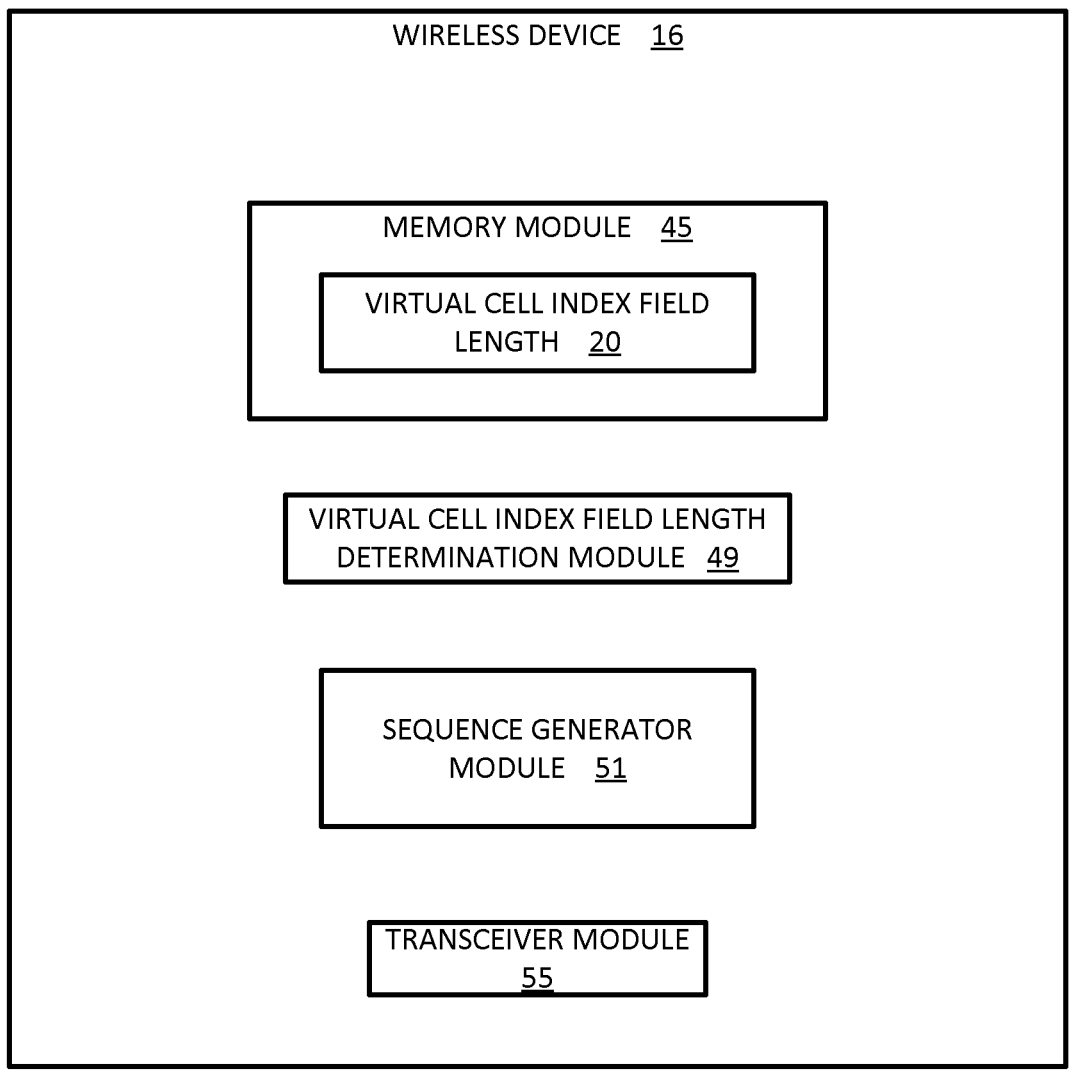
FIG. 5 is a block diagram of an alternative embodiment of the wireless device, which may be implemented in part by software modules executed by a processor.

FIG. 5 is a block diagram of an alternative embodiment of the wireless device 16, which may be implemented at least in part by software modules executed by a processor. A memory module 45 is configured to store the virtual cell index field length 48 received from the network node 14. The virtual cell index field length is determined by a virtual cell index field length determiner 49 of the wireless device 16. A sequence generator module 51 generates a pseudo-random sequence based on one of the physical layer cell ID, a single virtual cell ID, or a virtual cell ID identified by a virtual cell index contained in the DCI received by the transceiver module 55.

Figure 6:
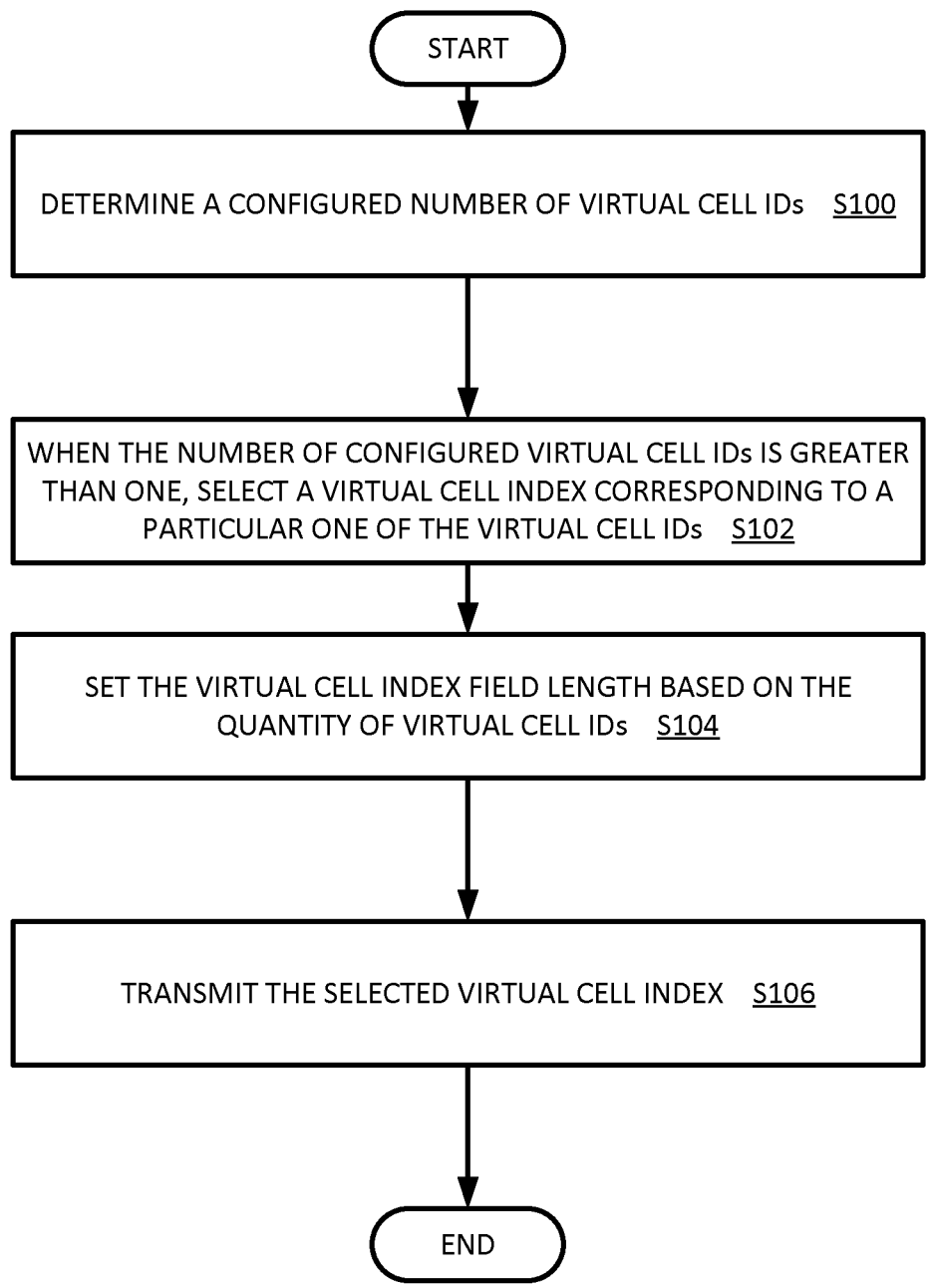
FIG. 6 is a flowchart of an exemplary process in a network node of determining a length of a virtual cell index field.

FIG. 6 is a flowchart of an exemplary process in a network node 14 of determining a length of a virtual cell index field. The process includes determining a configured number of virtual cell IDs (block S100). That is, the number of virtual cells configured by the network node 14 is determined. When the number of configured virtual cell IDs is greater than one, the process includes selecting a virtual cell index corresponding to a particular one of the virtual cell IDs (block S102). The virtual cell index field length is set based on the quantity of virtual cells configured by the network node 14 via the virtual cell index field length determiner 30 (block S104). The selected virtual cell index is transmitted by the transceiver 34 to the wireless device 16 (block S106).

Figure 7:
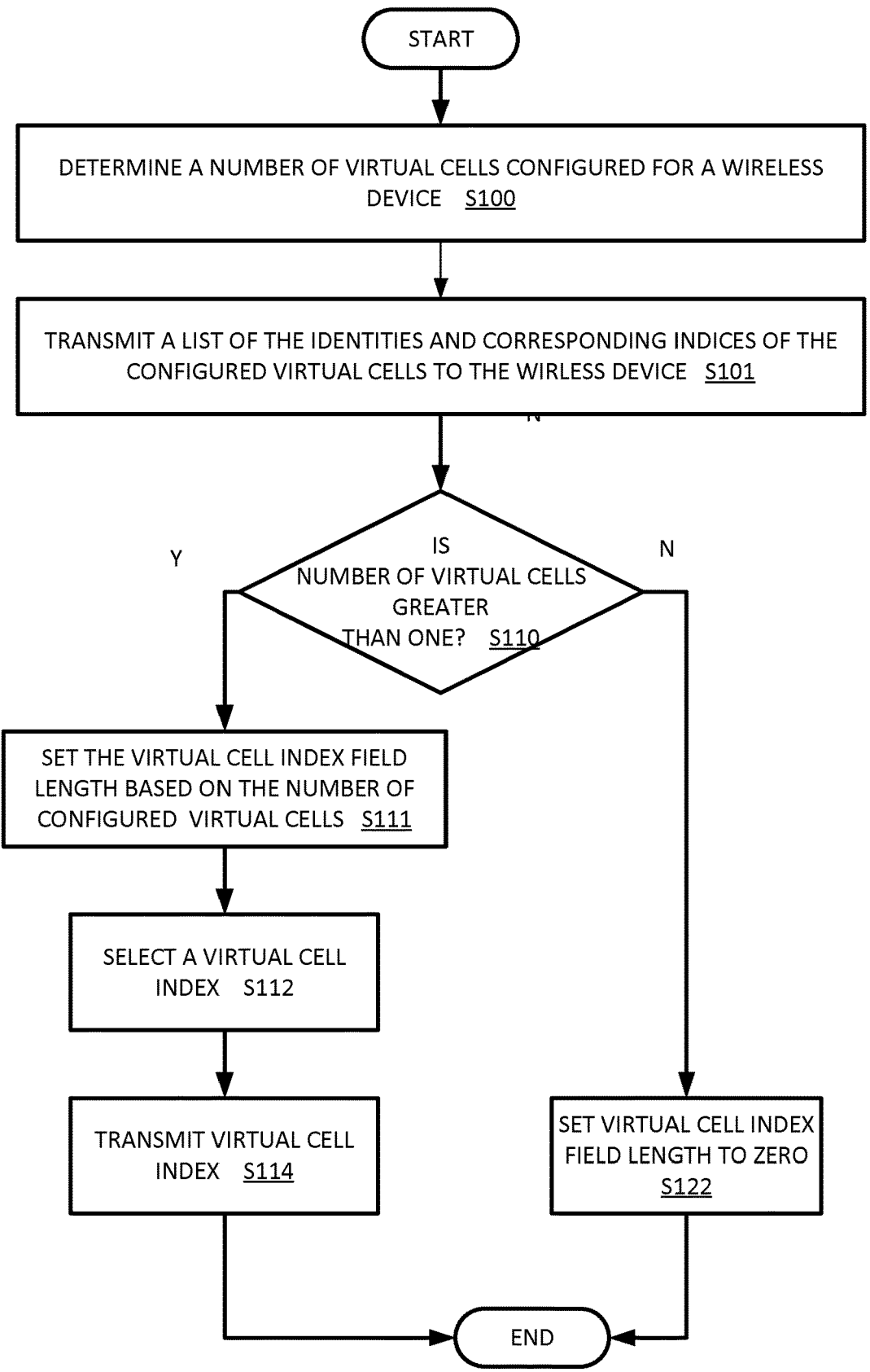
FIG. 7 is a more detailed flowchart of an exemplary process in a network node of determining a length of a virtual cell index field

FIG. 7 is a more detailed flowchart of an exemplary process in a network node 14 of determining a length of a virtual cell index field that accounts for the case where the virtual cell index field has length of zero. The process includes determining a number of virtual cells configured for by the network node 14 (block S100). That is, the number of virtual cells configured by the network node 14 is determined. In some embodiments, the process also includes transmitting a list of the determined configured virtual cell identifiers and their corresponding indices to the wireless device 16 (block S101). A determination is made whether the number of configured virtual cells is greater than one (block S110). If the number of configured virtual cells is greater than one, the virtual cell index length determiner 30 sets the virtual cell index field length (block S111). Then, a virtual cell index is selected among the indices corresponding to the configured virtual cells (block S112). The virtual cell index is transmitted via the transceiver 34 of the network node 14 to the wireless device 16 (block S114). If the number of virtual cells is not greater than one, but is rather, zero or one (block S110), then the network node 14 sets the virtual cell index field length to zero (block S122).

Figure 8:
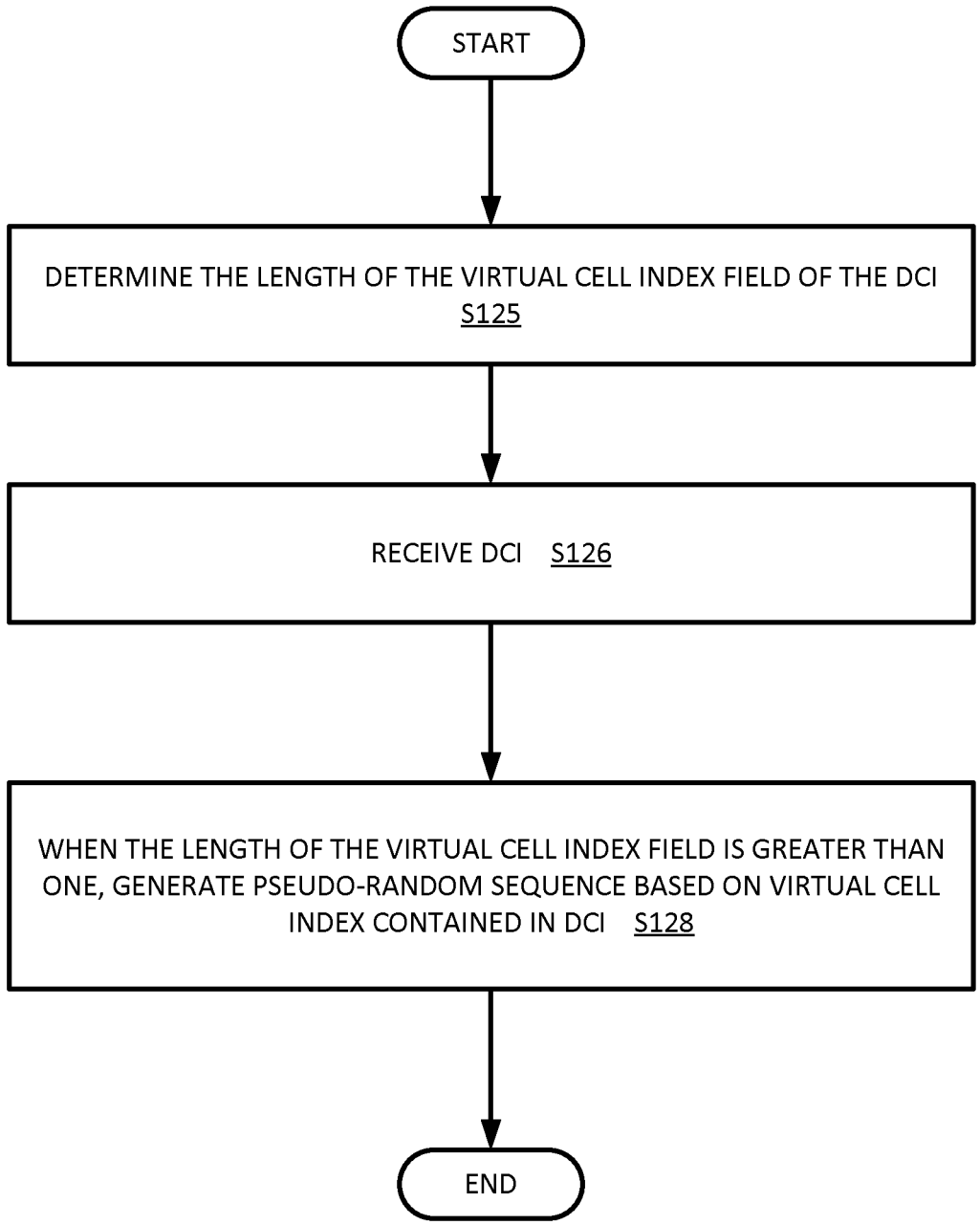
FIG. 8 is a flowchart of an exemplary process in a wireless device of generating a pseudo-random sequence based on information received from a network node.

FIG. 8 is a flowchart of an exemplary process in a wireless device 16 of generating a pseudo-random sequence based on information received from a network node 14 The wireless device 16 determines the length of the virtual cell index field (block S125). The transceiver 54 receives downlink control information (DCI) from the network node 14 (block S126). When the length of the virtual cell index field is greater than one, the sequence generator 50 of the wireless device 16 generates the pseudo-random sequence based on the virtual cell index contained in the virtual cell index field of the DCI (block S128).

Figure 9:
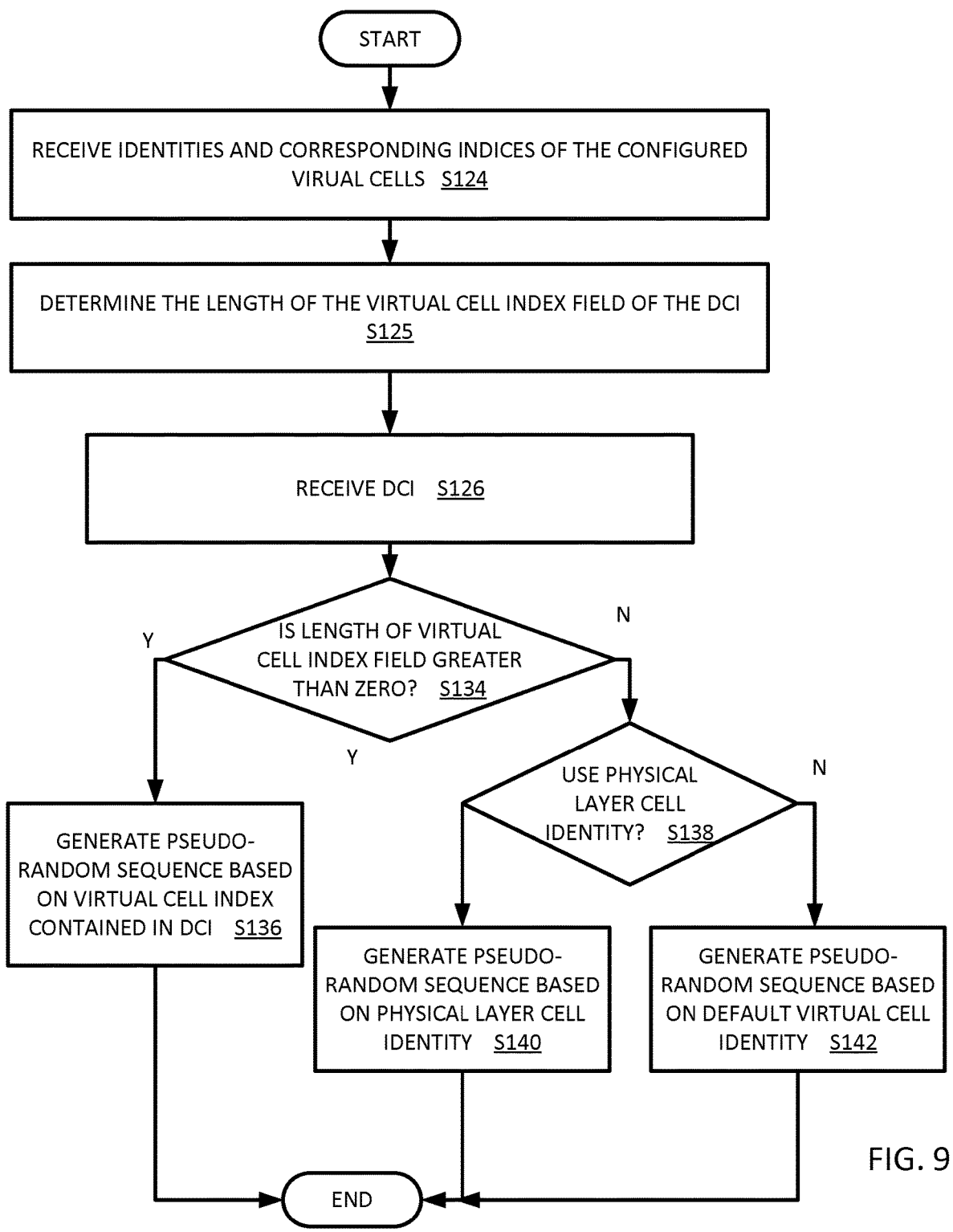
FIG. 9 is a more detailed flowchart of a process in a wireless device of generating a pseudo-random sequence based on information received from a network node.

FIG. 9 is a more detailed flowchart of a process in a wireless device 16 of generating a pseudo-random sequence based on information received from a network node 14 that accounts for the case where the virtual cell index field has length of zero. The process includes, receiving via the transceiver 54, identities and corresponding indices of cells configured by the network node 14 (block S124). From the total number of configured virtual cells, t the wireless device 16 determines the length of the virtual cell index field (block S125). The process also includes receiving, via the transceiver 54, the DCI (block S126). If the length of the virtual cell index field is greater than zero (block S134), then the sequence generator 50 generates the pseudo-random sequence based on a virtual cell index contained in the virtual cell index field of the received DCI (block S136). If the length of the virtual cell index is zero (block S134), and the number of configured virtual cells configure by the network node 14 is zero, the wireless device 16 uses the physical layer cell identity (block S138) then the wireless device 16 generates the pseudo-random sequence based on the physical layer cell identity (block S140). Otherwise, the wireless device 16 generates the pseudo-random sequence based on the virtual cell identity (block S142). Once again, the virtual cell identity used here is the configured virtual cell ID when only one virtual cell is configured by the network node 14.

Figure 10:
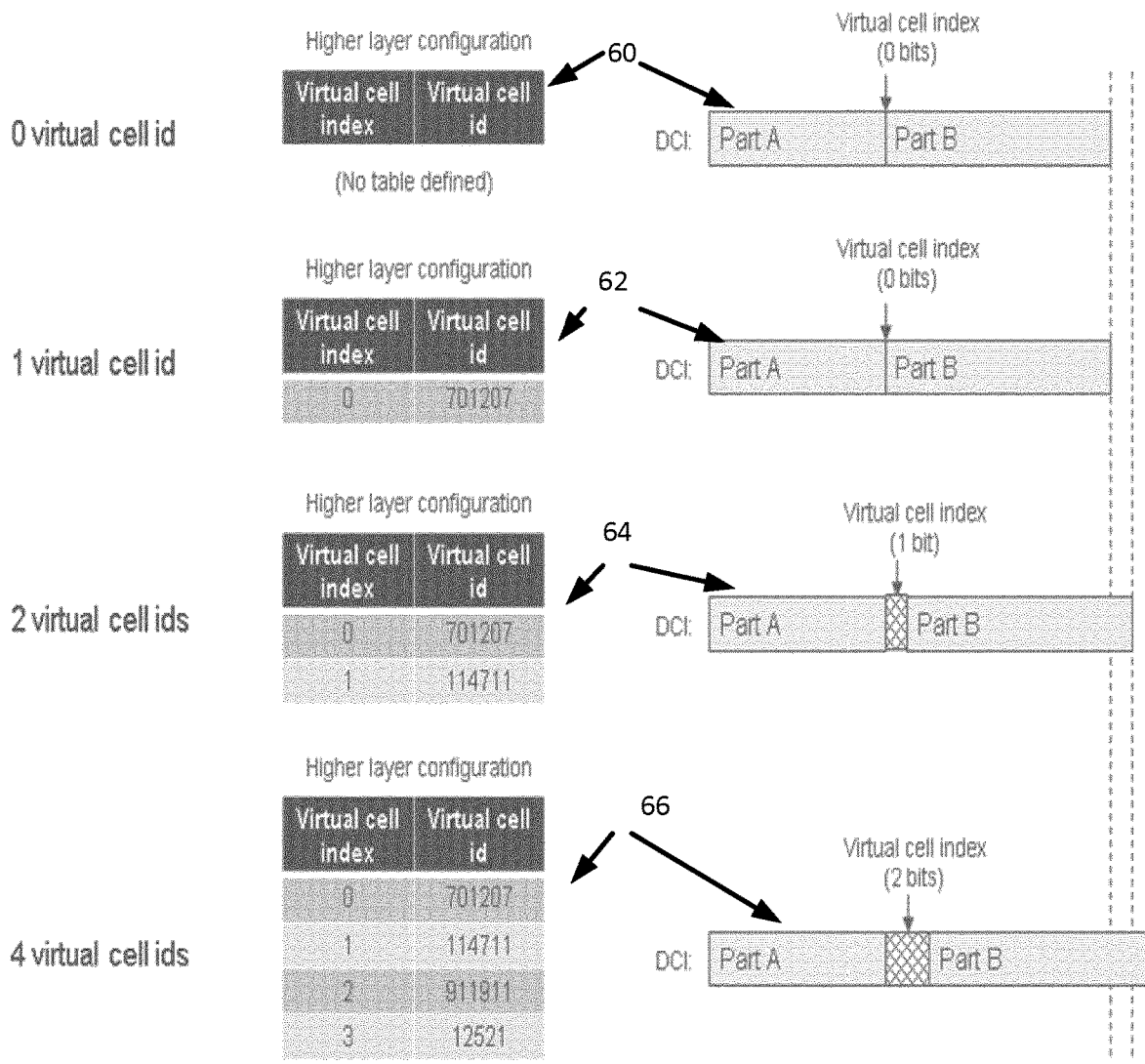
FIG. 10 illustrates several examples for determining a virtual cell index length.

FIG. 10 illustrates several examples for determining a virtual cell index length. In a first example 60, no virtual cells are configured and, consequently, the length of the virtual cell index field is zero bits. In a second example 62, 1 virtual cell is configured and the length of the virtual cell index field is zero bits. In a third example 64, two virtual cells are configured and the length of the virtual cell index field is 1 bit. In the fourth example 66, four virtual cells are configured and the length of the virtual cell index field length is 2 bits. In one embodiment, the number of bits of the virtual cell index field may be determined as $\log_2(N)$, where N is the number of configured virtual cells. In one embodiment, each virtual cell may correspond to a different neighboring base station in a coordinated multipoint (CoMP) configuration, where the neighboring base stations participate in the transmission of downlink signals to a wireless device 16 and participate in the reception of uplink signals from the wireless device.

In some embodiments, instead of generating a reference symbol sequence, the methods described herein can be applied to generating a scrambling sequence for scrambling of control and data channels. In another embodiment, instead of using a virtual cell ID or the physical layer cell ID to generate the pseudo-random sequence, one may use a virtual wireless device ID. For example, the identity of the wireless device 16, such as a cell radio network temporary identifier (C-RNTI), may be used to generate the pseudo-random sequence. In some embodiments, in the alternative to, or in addition to, using the virtual cell ID as a seed to initiate the pseudo-random sequence, the virtual cell ID may be used to calculate the pseudo-random sequence.

Thus, some embodiments include a method for use in a network node 14 of determining a length of a virtual cell index field to be transmitted with downlink control information, DCI, the virtual cell index field length for transmitting a virtual cell index to a wireless device 16 being dynamically settable. The method includes determining a number of configured virtual cell identities, IDs (block S100). When a number of configured virtual cell IDs is greater than one the method includes selecting a virtual cell index corresponding to a particular one of the virtual cell IDs (block S102), setting the virtual cell index field length based on the number of virtual cell IDs (block S104), and transmitting the selected virtual cell index in the virtual cell index field to the wireless device 16 (block S106).

In some embodiments, the method also includes transmitting the configured virtual cell identities to the wireless device 16 (block S101). In some embodiments, when the number of virtual cell IDs is zero, the method includes setting the length of the virtual cell index field to be of length zero, and transmitting no virtual cell IDs, thereby causing the wireless device 16 to use a physical layer cell identity to generate a pseudo-random sequence (block S118). In some embodiments, when the number of virtual cell IDs is one, the method includes setting the length of the virtual cell index field to be of length zero, and transmitting a single virtual cell ID, thereby causing the wireless device 16 to use the one virtual cell identity to generate a pseudo-random sequence (block S120). In some embodiments, the pseudo-random sequence is one of a reference sequence and a scrambling sequence. In some embodiments, the length of the virtual cell index field is log2(N) bits where N is the number of configured virtual cell IDs. In some embodiments, an identity of the wireless device 16 is used to generate a pseudo-random sequence.

In some embodiments, a network node for determining a length of a virtual cell index field in downlink control information, DCI, is provided, where the virtual cell index field length for transmitting a virtual cell index to a wireless device 16 being dynamically settable. The network node 14 includes processing circuitry 22 configured to determine a number of configured virtual cell identities, IDs. When a number of configured virtual cell IDs is greater than one, the processing circuitry is configured to select a virtual cell index of a particular one of the virtual cells, and set the virtual cell index field length based on a number of virtual cell IDs. The network node 14 also includes a transmitter 34 configured to and transmit the selected virtual cell index in the virtual cell index field to the wireless device 16.

In some embodiments, the transmitter 34 transmits the configured virtual cell identities to the wireless device 16. In some embodiments, when the number of virtual cells configured for the wireless device 16 is zero, the processing circuitry 22 is further configured to set the length of the virtual cell index field to be of length zero, in which case no virtual cell ID is transmitted by the transmitter to the wireless device 16 to cause the wireless device 16 to use a physical layer cell identity to generate a pseudo-random sequence. In some embodiments, when the number of virtual cells configured for the wireless device 16 is one, the processing circuitry 22 is further configured to set the length of the virtual cell index field to be of length zero, in which case one virtual cell ID is transmitted to the wireless device 16 to cause the wireless device 16 to use the one virtual cell identity to generate a pseudo-random sequence. In some embodiments, the pseudo-random sequence is one of a reference sequence and a scrambling sequence. In some embodiments, the length of the virtual cell index field is log2(N) bits where N is the number of configured virtual cell IDs. In some embodiments, an identity of the wireless device 16 is used to generate one of a reference sequence and a scrambling sequence.

In some embodiments, a network node for determining a length of a virtual cell index field in downlink control information, DCI, is provided, where the virtual cell index field length for transmitting a virtual cell index to a wireless device 16 being dynamically settable. The network node 14 includes a virtual cell determiner module 31 configured to determine a number of configured virtual cell identities, IDs. The network node 14 includes a virtual cell selector module 33 configured to select a particular one of the virtual cell IDs when a number of virtual cells configured for the wireless device 16 is greater than one. The network node 14 also includes a virtual cell index field length determiner module 19 configured to set the virtual cell index field length based on the number of virtual cell IDs. The network node 14 further includes a transmitter module 35 configured to transmit the selected virtual cell index in the virtual cell index field to the wireless device 16.

In some embodiments, a method for use in a wireless device of generating a pseudo-random sequence based on information received from a network node 14 is provided. The method includes determining a length of a virtual cell index field of downlink control information, DCI, based on the number of configured virtual cell IDs (block S125). The method further includes receiving the DCI from the network node 14 (block S126). When the length of the virtual cell index field is greater than zero, the method includes generating the pseudo-random sequence based on a virtual cell index contained in the virtual cell index field of the received DCI (block S128).

In some embodiments, the method further includes receiving the number of configured virtual cell identities, IDs, from the network node 14. In some embodiments, the method further includes determining whether one of a physical layer cell identity and a virtual cell identity is to be used to generate the pseudo-random sequence based on the received number of virtual cell IDs. In some embodiments, the pseudo-random sequence is one of a reference sequence and a scrambling sequence. In some embodiments, an identity of the wireless device 16 is used to generate the pseudo-random sequence.

In some embodiments, a wireless device configured to generate a pseudo-random sequence based on information received from a network node 14 is provided. The wireless device 16 includes a receiver 54 configured to receive DCI from the network node 14. The wireless device 16 further includes processing circuitry 42 configured to determine a length of a virtual cell index field of the DCI based on the number of configured virtual cell IDs, and, when the length of the virtual cell index field is greater than zero, generate the pseudo-random sequence based on a virtual cell index contained in the virtual cell index field of the received DCI.

In some embodiments, the receiver 54 is further configured to receive a number of configured virtual cell identities, IDs, from the network node 14. In some embodiments, the processing circuitry 42 is further configured to determine whether one of a physical layer cell identity and a virtual cell identity is to be used to generate the pseudo-random sequence based on the received number of virtual cell IDs. In some embodiments, the pseudo-random sequence is one of a reference sequence and a scrambling sequence. In some embodiments, an identity of the wireless device 16 is used to generate the pseudo-random sequence.

In some embodiments, a wireless device configured to generate a pseudo-random sequence based on information received from a network node 14 is provided. The wireless device 16 includes a receiver module 55 configured to receive DCI from the network node 14. A virtual cell index field length determination module 49 is configured to determine a length of a virtual cell index field of the DCI based on a number of configured virtual cell IDs. The wireless device 16 also includes a sequence generator module 50 configured to, when the length of the virtual cell index field is greater than zero, generate the pseudo-random sequence based on a virtual cell index contained in the virtual cell index field of the received DCI.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an objectoriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for use in a network node of determining a length of a virtual cell index field to be transmitted with downlink control information, DCI, the virtual cell index field length for transmitting a virtual cell index to a wireless device being dynamically settable, the method comprising:
    determining a number of configured virtual cell identities, IDs; and
    when a number of configured virtual cell IDs is greater than one:
        selecting a virtual cell index corresponding to a particular one of the virtual cell IDs;
        setting the virtual cell index field length based on the number of virtual cell IDs; and
        transmitting the selected virtual cell index in the virtual cell index field to the wireless device; and
    when the number of configured virtual cell IDs is zero, setting the length of the virtual cell index field to be of length zero and transmitting no virtual cell IDs to the wireless device, thereby causing the wireless device to use a physical layer cell identity to generate a pseudo-random sequence.

2. The method of claim 1, further comprising transmitting the configured virtual cell identities to the wireless device.

3. The method of claim 1, wherein when the number of virtual cell IDs is one, setting the length of the virtual cell index field to be of length zero and transmitting a single virtual cell ID to the wireless device, thereby causing the wireless device to use the single virtual cell ID to generate a pseudo-random sequence.

4. The method of claim 1, wherein the pseudo-random sequence is one of a reference sequence and a scrambling sequence.

5. The method of claim 1, wherein the length of the virtual cell index field is log2(N) bits where N is the number of configured virtual cell IDs.

6. The method of claim 1, wherein an identity of the wireless device is used to generate a pseudo-random sequence.

7. A network node for determining a length of a virtual cell index field in downlink control information, DCI, the virtual cell index field length for transmitting a virtual cell index to a wireless device being dynamically settable, the network node comprising:
    processing circuitry configured to:
        determine a number of configured virtual cell identities, IDs; and
        when a number of configured virtual cell IDs is greater than one:
            select a virtual cell index of a particular one of the virtual cells; and
            set the virtual cell index field length based on the number of virtual cell IDs; and
        when the number of configured virtual cell IDs is zero, set the length of the virtual cell index field to be of length zero and transmit no virtual cell IDs to the wireless device, thereby causing the wireless device to use a physical layer cell identity to generate a pseudo-random sequence; and
    a transmitter configured to transmit the selected virtual cell index in the virtual cell index field to the wireless device.

8. The network node of claim 7, wherein the transmitter is further configured to transmit the configured virtual cell identities to the wireless device.

9. The network node of claim 7, wherein when the number of virtual cells configured for the wireless device is one, the processing circuitry is further configured to set the length of the virtual cell index field to be of length zero, in which case one virtual cell ID is transmitted to the wireless device to cause the wireless device to use the one configured virtual cell identity to generate a pseudo-random sequence.

10. The network node of claim 7, wherein the pseudo-random sequence is one of a reference sequence and a scrambling sequence.

11. The network node of claim 7, wherein the length of the virtual cell index field is log2(N) bits where N is the number of configured virtual cell IDs.

12. The network node of claim 8, wherein an identity of the wireless device is used to generate one of a reference sequence and a scrambling sequence.

13. A method for use in a wireless device of generating a pseudo-random sequence based on information received from a network node, the method comprising:
    determining a length of a virtual cell index field of downlink control information, DCI, based on a number of configured virtual cell identities, IDs;
    receiving the DCI from the network node;
    when the length of the virtual cell index field is greater than zero, generating the pseudo-random sequence based on a virtual cell index contained in the virtual cell index field of the received DCI; and
    when the number of configured virtual cell IDs is zero, set the length of the virtual cell index field to be of length zero and transmit no virtual cell IDs to the wireless device, thereby causing the wireless device to use a physical layer cell identity to generate a pseudo-random sequence.

14. The method of claim 13, further comprising receiving the number of configured virtual cell IDs from the network node.

15. The method of claim 14, further comprising determining whether one of a physical layer cell identity and a virtual cell identity is to be used to generate the pseudo-random sequence, based on the received number of virtual cell IDs.

16. The method of claim 14, wherein the pseudo-random sequence is one of a reference sequence and a scrambling sequence.

17. The method of claim 13, wherein an identity of the wireless device is used to generate the pseudo-random sequence.

18. A wireless device configured to generate a pseudo-random sequence based on information received from a network node, the wireless device comprising:
 a receiver configured to receive downlink control information, DCI, from the network node; and
 processing circuitry configured to:
  determine a length of a virtual cell index field of the DCI based on a number of configured virtual cell identities, IDs;
  when the length of the virtual cell index field is greater than zero, generate the pseudo-random sequence based on a virtual cell index contained in the virtual cell index field of the received DCI; and
  when the number of configured virtual cell IDs is zero, set the length of the virtual cell index field to be of length zero and transmit no virtual cell IDs to the wireless device, thereby causing the wireless device to use a physical layer cell identity to generate a pseudo-random sequence.

19. The wireless device of claim 18, wherein the receiver is further configured to receive a number of configured virtual cell IDs from the network node.

20. The wireless device of claim 19, wherein the processing circuitry is further configured to determine whether one of a physical layer cell identity and a virtual cell identity is to be used to generate the pseudo-random sequence, based on the received number of virtual cell IDs.

21. The wireless device of claim 19, wherein the pseudo-random sequence is one of a reference sequence and a scrambling sequence.

22. The wireless device of claim 18, wherein an identity of the wireless device is used to generate the pseudo-random sequence.

* * * * *